United States Patent Office.

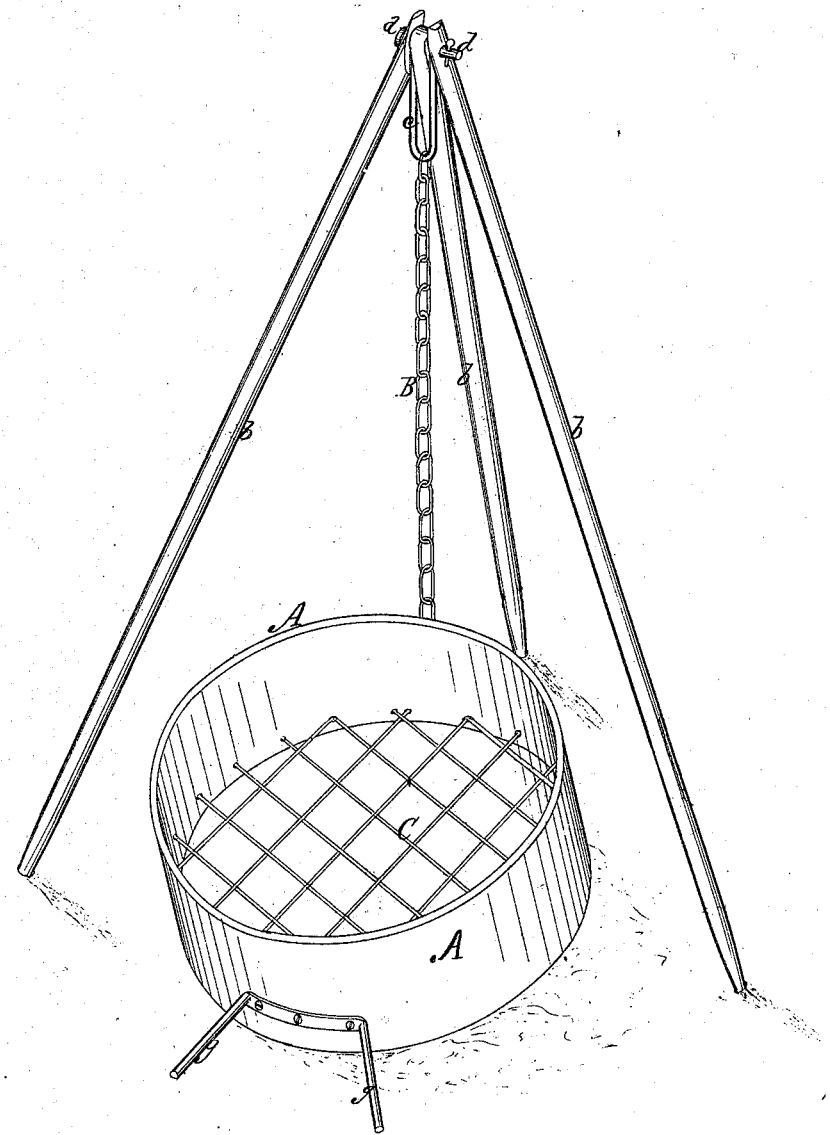

JOHN F. UNGLISH, OF WEBSTER, NEW YORK.

Letters Patent No. 102,886, dated May 10, 1870.

IMPROVEMENT IN APPARATUS FOR ASSORTING POTATOES, &c.

The Schedule referred to in these Letters Patent and making part of the same.

I, JOHN F. UNGLISH, of Webster, in the county of Monroe and State of New York, have invented a certain new and useful Improvement in Apparatus for Sorting Potatoes and other Vegetables and Removing Dirt from the Same, of which the following is a specification.

My improvement consists in the combination of a sieve or screen with the crotched standards and the pendent bearing or chain, substantially as hereinafter described.

The drawing represents a perspective view of my improved apparatus.

In the drawing—

A indicates the rim or hoop that forms the sides of the sieve, and C is the screen or perforated bottom, which is composed of wire-gauze, perforated metal, or other material suitable for the purpose.

The sieves may be made of various degrees of coarseness, so as to adapt them to vegetables of different kinds and sizes.

To one side of the sieve A is secured a chain, B, or other pendent bearing, that is suspended from a link, c, at the top of the crotched standards b b b, where they are connected together by means of a bolt, d.

On the opposite side of the sieve from the pendent bearing B, I provide handles g g.

The bearing B is made of such length as to hold the side of the sieve to which it is connected slightly elevated from the ground or floor, and thus give it a sloping or inclined position while it receives the vegetables.

A sufficient quantity being filled into the sieve, it is then elevated entirely from the ground by means of the handles g g, and a violent lateral or side motion is imparted to it by the operator, by which means the vegetables or fruits of smaller size are sifted through the openings or perforations of the sieve, while those of large size remain.

By this action not only are the smaller vegetables or fruits separated from the larger ones, but the dirt will also be effectually removed from the same, which is an advantage of much importance.

What I claim as my improvement is—

The combination and arrangement of the standards b b b, sieve A, having handles g g, and a pendent bearing B, substantially as herein described.

In testimony whereof I hereunto sign my name in the presence of two subscribing witnesses.

JOHN F. UNGLISH.

Witnesses:
J. A. DAVIS,
FRED. A. HATCH.